(12) United States Patent
Watanabe (10) Patent No.: US 7,516,684 B2
(45) Date of Patent: Apr. 14, 2009

(54) SHAFT ARRANGEMENT STRUCTURE OF ENGINE

(75) Inventor: Yoshio Watanabe, Kakogawa (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 369 days.

(21) Appl. No.: 11/472,310

(22) Filed: Jun. 22, 2006

(65) Prior Publication Data
US 2006/0293104 A1 Dec. 28, 2006

(30) Foreign Application Priority Data
Jun. 28, 2005 (JP) ............... P2005-188574

(51) Int. Cl.
*F16H 57/04* (2006.01)
*F16H 57/02* (2006.01)
*F16C 7/00* (2006.01)
*F16C 9/00* (2006.01)

(52) U.S. Cl. .................. 74/606 R; 123/197.4
(58) Field of Classification Search .......... 74/606 R; 123/52.3, 195 R, 197.4
See application file for complete search history.

(56) References Cited

U.S. PATENT DOCUMENTS

| | | | | |
|---|---|---|---|---|
| 5,078,105 | A * | 1/1992 | Ito et al. ............ | 123/195 R |
| 5,636,608 | A * | 6/1997 | Shichinohe et al. ...... | 123/197.1 |
| 6,470,770 | B2 * | 10/2002 | Ito et al. ............ | 74/730.1 |
| 7,152,706 | B2 * | 12/2006 | Pichler et al. ......... | 180/68.3 |
| 7,353,792 | B2 * | 4/2008 | Oda et al. ........... | 123/195 R |

FOREIGN PATENT DOCUMENTS

| | | | |
|---|---|---|---|
| JP | 2-43886 | | 10/1990 |
| JP | 2005082016 | A * | 3/2005 |

OTHER PUBLICATIONS

Copending U.S. Application: Inventor—Yoshio Watanabe; Title: "Lubricating System of Engine,".

* cited by examiner

*Primary Examiner*—Tisha D Lewis
(74) *Attorney, Agent, or Firm*—Wenderoth, Lind & Ponack, L.L.P.

(57) ABSTRACT

In a shaft arrangement structure of an engine which is provided with a crank case divided into upper and lower two members, forms a transmission room accommodating a transmission within the crank case, and utilizes a lower portion of the transmission room as an oil reservoir chamber, an input shaft of the transmission is positioned above a line connecting an axis of the crank shaft of the engine and an axis of the output shaft of the transmission as seen in an axial direction. An angle formed between a first segment connecting the axis of the crank shaft and the axis of the input shaft and a center line of a cylinder of the engine above the axis of the crank shaft is acute.

7 Claims, 6 Drawing Sheets

SHAFT ARRANGEMENT STRUCTURE OF ENGINE

BACKGROUND OF THE INVENTION

1. Field of the Invention

The present invention relates to a shaft arrangement structure of an engine, and more particularly to a shaft arrangement structure of a semidry sump type engine which has a crank case divided into upper and lower two members, has a transmission room accommodating a transmission within the crank case, and utilizes a lower portion of the transmission room as an oil reservoir chamber of the engine.

2. Description of the Related Art

In a semidry sump type engine mounted on a vehicle such as a motorcycle or the like, a crank shaft is provided within a crank chamber of a crank case, at least an input shaft and an output shaft of a transmission are provided within the transmission room of the crank case, and a change drum and the like of the transmission are provided within the transmission room.

Further, in the case that the crank case is structured such as to be divided into upper and lower two members, the crank shaft, the input shaft and the output shaft are generally arranged in such a manner that axes thereof exist on a mating surface (a split surface) of the upper and lower members of the crank case, while taking an assembling property of each of the shafts, the transmission and the like into consideration (refer to Japanese Patent Publication No. 2-43886).

In the engine mentioned above, in the case of assembling the crank shaft and the transmission within the crank case, before connecting the upper and lower crank case members, the crank shaft, the input shaft and the output shaft positioned on the mating surface are assembled, for example, in the lower member, and the upper member is thereafter connected to the lower member.

However, in the shaft arrangement as mentioned above, since the crank shaft, the input shaft and the output shaft are arranged in a line on the mating surface of the crank case at an interval in a longitudinal direction (front and rear direction) as seen from the side, a dimension in the longitudinal direction of the engine becomes longer, and the engine is enlarged in size.

Further, for example, the input shaft is generally provided with a clutch, particularly a friction clutch for transmitting a rotation of the crank shaft so as to freely engage and disengage, however, in the case that the input shaft is arranged on the mating surface of the crank case as mentioned above, a position of a lower end portion of the clutch becomes lower. Accordingly, an oil capacity (an oil level) of an oil reservoir chamber is limited on the basis of a necessity of avoiding a reduction of an output caused by a stirring or agitation of the oil by the clutch.

SUMMARY OF THE INVENTION

The present invention addresses the above described condition, and an object of the present invention is to provide a semidry sump type engine which can make a dimension in a longitudinal direction of the engine compact and can increase an oil capacity without generating an output reduction of the engine due to an oil stirring or agitation.

In order to achieve the object mentioned above, in accordance with the present invention, there is provided a shaft arrangement structure of an engine which is provided with a crank case divided into upper and lower two members, forms a transmission room accommodating a transmission of the engine within the crank case, and utilizes a lower portion of the transmission room as an oil reservoir chamber of the engine, wherein an input shaft of the transmission is positioned in an upper side of (i.e. above) a line connecting an axis of the crank shaft of the engine and an axis of the output shaft of the transmission as seen in an axial length direction of the crank shaft, and an angle formed between a first segment connecting the axis of the crank shaft and an axis of the input shaft, and a center line of a cylinder of the engine above the axis of the crank shaft is acute.

In accordance with the structures mentioned above, it is possible to make the dimension in the longitudinal direction of the engine compact, and it is possible to make a position of the input shaft 14 high, whereby, it is possible to increase the oil capacity.

In the shaft arrangement structure of the engine preferably, the axis of the crank shaft and the axis of the output shaft may be arranged on a mating surface of the upper and lower members of the crank case.

In accordance with the structures mentioned above, it is possible to improve an assembling property of the crank shaft and the output shaft.

In the shaft arrangement structure of the engine preferably, the axis of the crank shaft and the axis of the input shaft may be arranged on a mating surface of the upper and lower members of the crank cases.

In accordance with the structures mentioned above, it is possible to improve an assembling property of the crank shaft and the input shaft.

In the shaft arrangement structure of the engine preferably, a clutch to connect drivingly the crank shaft and the transmission may be installed at an end portion of the input shaft.

In accordance with the structure mentioned above, it is possible to avoid the clutch from dipping in oil in the oil reservoir chamber to reduce a stirring resistance while increasing an oil amount in the oil reservoir chamber.

In the shaft arrangement structure of the engine, preferably, the output shaft may be arranged at a position more away from the crank shaft than the input shaft, and the output shaft may be arranged in such a manner that a downward open angle formed between a second segment connecting the axis of the output shaft and the axis of the input shaft, and the first segment is obtuse.

In accordance with the structure mentioned above, it is possible to make the dimension in the longitudinal direction of the engine more compact, and it is possible to further increase the oil capacity of the oil reservoir chamber because the position of the output shaft becomes high.

In the shaft arrangement structure of the engine, it is preferable that a transmission assembly is structured such that the input shaft and the output shaft are supported by a shaft supporting member, and the transmission assembly is installed in the transmission room so as to be detachable as one unit.

In accordance with the structure mentioned above, it can be easily realized to arrange the input shaft in the upper side of (i.e. above) the line connecting the axis of the crank shaft and the axis of the output shaft as seen in the axial length direction of the crank shaft, and to make the angle between the first segment connecting the axis of the crank shaft and the axis of the input shaft, and the center line of the cylinder acute.

In the shaft arrangement structure of the engine, preferably the shaft supporting member of the transmission assembly may be structured so as to also support a change drum and a shift fork support shaft of the transmission also.

In accordance with the structure mentioned above, it is possible to reduce the number of the supporting parts, and it is possible to improve an assembling property of the change drum and the shift fork support shaft.

In the shaft arrangement structure of the engine preferably, an end portion of the input shaft protrudes from the shaft supporting member, and the clutch may be installed at the protruding end portion.

BRIEF DESCRIPTION OF THE DRAWINGS

The above and other objects, features and advantages of the present invention will be become more apparent from the following description taken in connection with the accompanying drawings, in which.

DETAILED DESCRIPTION OF THE PREFERRED EMBODIMENTS

Embodiments

FIGS. 1 to 7 show an example obtained by applying the present invention to a parallel two-cylinder engine for a motor cycle, and a description will be given of an embodiment in accordance with the present invention with reference to these drawings.

Structure of Entire of Engine

Figure 1:
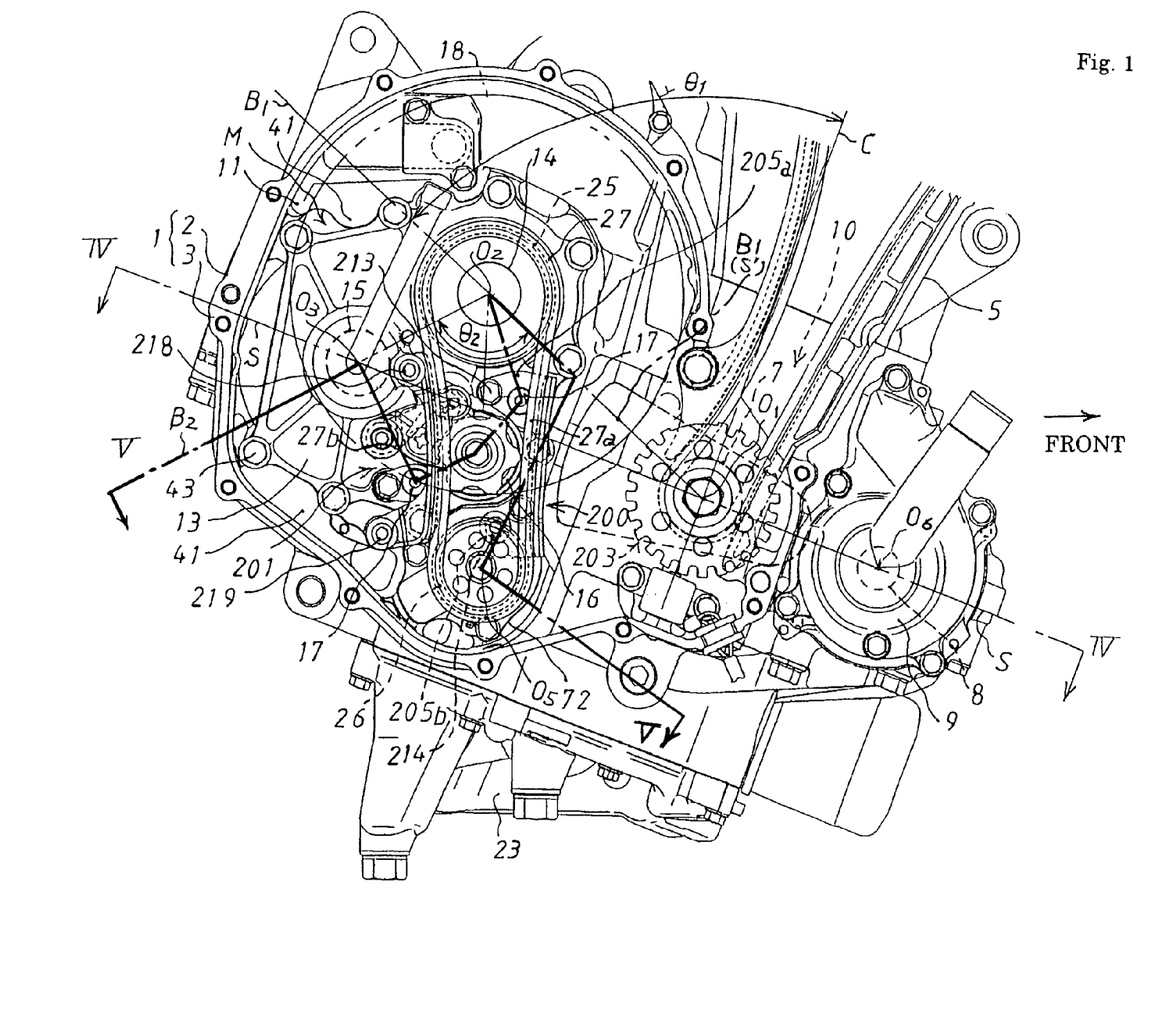
FIG. 1 is a right side view of a crank case portion, shown by detaching a clutch cover, of an in-line two-cylinder engine for a motorcycle to which an embodiment of the present invention is applied.
Figure 4:
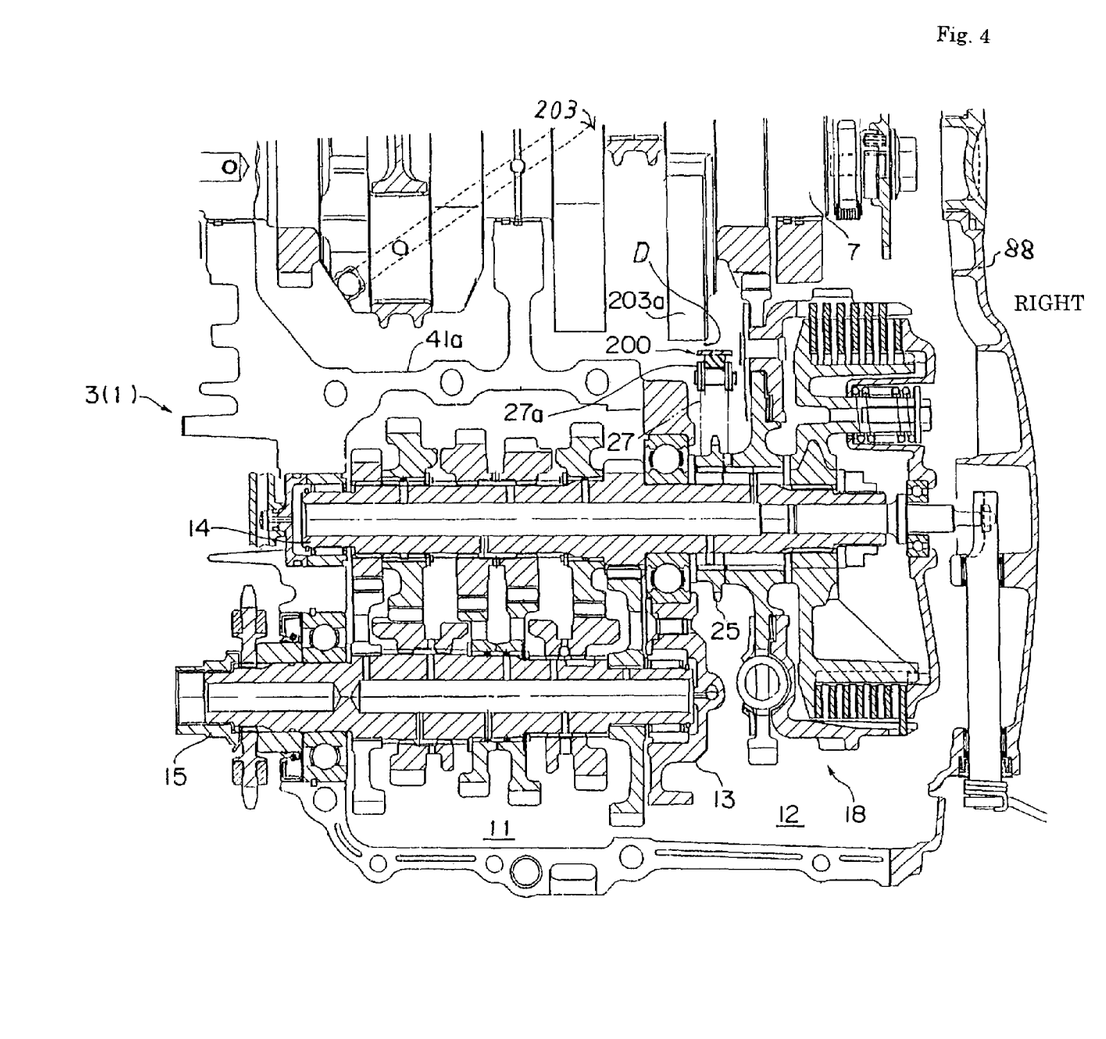
FIG. 4 is a cross sectional expansion plan view along a line IV-IV in FIG. 1.

FIG. 1 is a side view of a crank case portion shown by detaching a clutch cover 88 (refer to FIG. 4). As a matter of convenience for explanation, the following description will be given on the assumption that a side (a vehicle forward moving side) in which a cylinder 5 is arranged is the "front side" of the crank case 1, and a lateral direction (an axial direction of a crank shaft) when viewed from a rear side is the "lateral direction" of the crank case 1.

In FIG. 1, the crank case 1 is divided into an upper crank case member 2 and a lower crank case member 3 which are connected by a mating surface S. The cylinder 5 is fixed to an upper surface of a front half portion of the upper crank case member 2 in a forward tilting attitude, and a cylinder head and a head cover which are not illustrated are firmly attached sequentially to an upper surface of the cylinder 5. A front half portion of the crank case 1 forms a crank chamber 10 accommodating a crank shaft 7, a balancer shaft 8 is arranged in a front portion of the crank chamber 10, and a water pump 9 is provided in a right end portion of the balancer shaft 8. An oil pan 23 is attached to a lower surface of the crank case 1.

A rear half portion of the crank case 1 has a transmission room 11 accommodating a cassette type transmission assembly M, and the cassette type transmission assembly M is composed of an input shaft 14 coupled to the crank shaft 7 through a multiple disc friction clutch 18 (shown by a virtual line) installed thereto, an output shaft 15 coupled with the input shaft through change gears (see FIG. 5), a change drum 16, a pair of shift fork shafts 17 and the like for changing the change gears with the change drum 16, and shaft support member 13 formed independently from the crank case 1. The input shaft 14, the output shaft 15, the change drum 16, and the shift fork shafts 17 are supported by the shaft support member 13. The transmission assembly M is inserted as one unit into the transmission room 11 from a right side, and the shaft support member 13 is detachably fixed to a transmission mounting wall 41 formed in each of the upper and lower crank case members 2 and 3 by bolts 43 (reference numeral is attached only to a part thereof). A drive sprocket 25 for driving an oil feed pump 50 and an oil scavenging pump 51 (FIG. 3) is installed to a right end portion of the input shaft 14.

Figure 3:
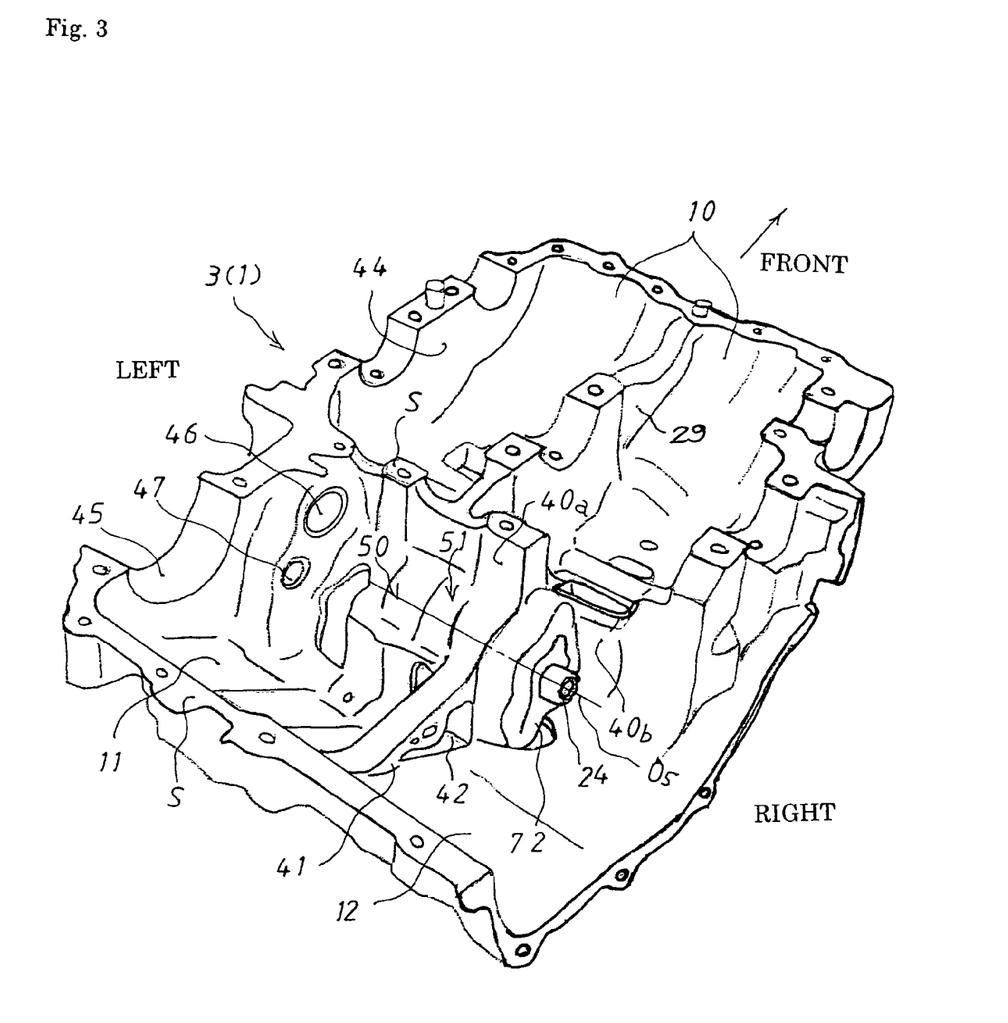
FIG. 3 is a perspective view of a lower crank case member in FIG. 1 as seen from a right rear upper side.

FIG. 3 is a perspective view of the lower crank case member 3 as seen from a right rear upper side. In this embodiment, the crank chamber 10 is partitioned into right and left sides by a partition wall 29 formed in a center portion in the lateral direction.

In a left side wall 44 of the lower crank case member 3 of the transmission room 11, there are formed a concave portion 45 for supporting the output shaft 15 (FIG. 1), a support hole 46 for supporting the change drum 16 (FIG. 1), and a closed-end concave portion 47 for supporting the shift fork shaft 17 (FIG. 1).

A clutch room 12 is formed in a right side of the transmission room 11 via the transmission mounting wall 41. In order to utilize a lower portion of the transmission room 11 and a lower portion of the clutch room 12 as an oil reservoir chamber, a partition wall 40a having a corresponding height to the mating surface S is formed between the transmission room 11 and the crank chamber 10, and a partition wall 40b lower than the mating surface S is formed between the clutch room 12 and the crank chamber 10. Further, a communication hole 42 communicating a lower end portion of the transmission room 11 with a lower end portion of the clutch room 12 so as to circulate the oil is formed in a lower end portion of the transmission mounting wall 41, whereby it is possible to simultaneously utilize the lower portion of the clutch room 12 and the lower portion of the transmission room 11 as the oil reservoir chamber.

In a lower end portion of the partition wall 40a, that is, a front lower end portion of the transmission room 11, there are provided the oil feed pump 50 for pressure feeding the oil within the oil reservoir chamber to each of lubricating portions of the engine, and the oil scavenging pump (a oil collecting pump) 51 for collecting the used oil coming back from the lubricating portions such as the crank shaft and the like to the oil reservoir chamber, side by side on an axis O5 of a common pump shaft 24.

[Feed Oil Pump and Scavenging Oil Pump]

Figure 5:
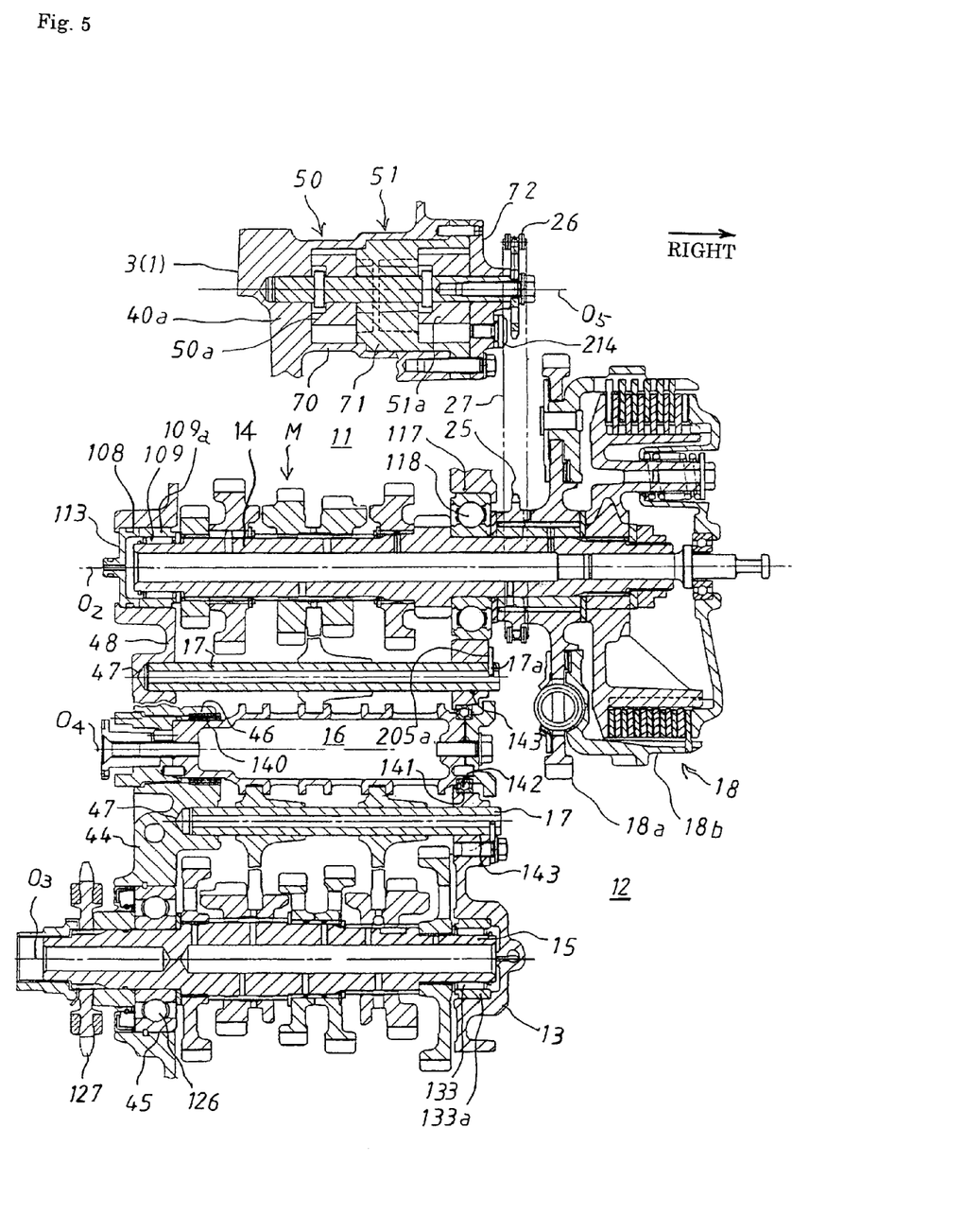
FIG. 5 is a cross sectional expansion plan view along a line V-V in FIG. 1.

FIG. 5 is a cross sectional expansion plan view (a cross sectional expansion plan view along a line V-V in FIG. 1) of the cassette type transmission M, the oil feed pump 50 and the oil scavenging pump 51. Both of the oil feed pump 50 and the oil scavenging pump 51 for collecting oil employ a trochoid pump. A casing of the oil scavenging pump 51 and a casing of the oil feed pump 50 are composed of a tubular outer casing portion 70, an intermediate casing member 71 and a pump cover 72. The tubular outer casing portion 70 is formed in the lower end portion of the partition wall 40a of the lower crank case member 3. The intermediate casing member 71 is fit into the outer casing portion 70, and an open right end of the intermediate casing member 71 is closed by the pump cover 72. The casing of the oil scavenging pump 51 is located in right side, and the casing of the oil feed pump 50 is located in left side. Inner rotors 50*a* and 51*a* arranged within the casings of the respective pumps 50 and 51 are firmly attached to the common pump shaft 24.

[Cassette Type Transmission Assembly]

In FIG. 5, a left end portion of the input shaft 14 of the transmission assembly M is supported in a penetrating support hole 108 formed in a left side wall 48 of the upper crank case member 2 (FIG. 1) of the transmission room 11 via a needle bearing 109. A right end portion of the input shaft 14 is supported in a penetrating support hole 117 formed in the shaft support member 13 via a ball bearing 118 and protrudes into the clutch room 12. The drive sprocket 25 for driving the pumps, and a clutch input gear 18*a* of the multiple disc friction clutch 18 are fitted to the right end portion of the input shaft 14 in the clutch room 12. A clutch housing 18*b* is fixed to the clutch input gear 18*a*.

A left end portion of the output shaft 15 is supported by a pair of upper and lower concave portions 45 respectively formed in the left side wall 48 of the upper crank case member 2 and the left side wall 44 of the lower crank case member 3 via a ball bearing 126, and protrudes to an outer side of the transmission room 11. An output sprocket 127 is fixed to the protruding portion. The output sprocket 127 is coupled in an interlocking manner to a sprocket of a rear axle via a chain for driving a rear wheel (not shown). A right end portion of the output shaft 15 is supported by a closed-end concave portion 132 formed in the shaft support member 13 via a needle bearing 133.

A left end portion of the change drum 16 is supported in the support hole 46 formed in the left side wall 44 of the lower crank case member 3 of the transmission room 11 via a needle bearing 140, and a right end portion of the change drum 16 is supported in a support hole 141 formed in the shaft support member 13 via a ball bearing 142.

The shift fork support shafts 17 are arranged up and down while holding the change drum 16 therebetween, left end portions of the shift fork support shafts 17 is respectively fitted in the closed-end concave portions 47 formed in the left side walls 44 and 48 of the upper and lower crank case members 2 and 3, and right end portions are fitted in penetrating fitting holes 143 formed in the shaft support member 13.

[Arrangement of Crank Shaft, Input Shaft and Output Shaft]

Figure 2:
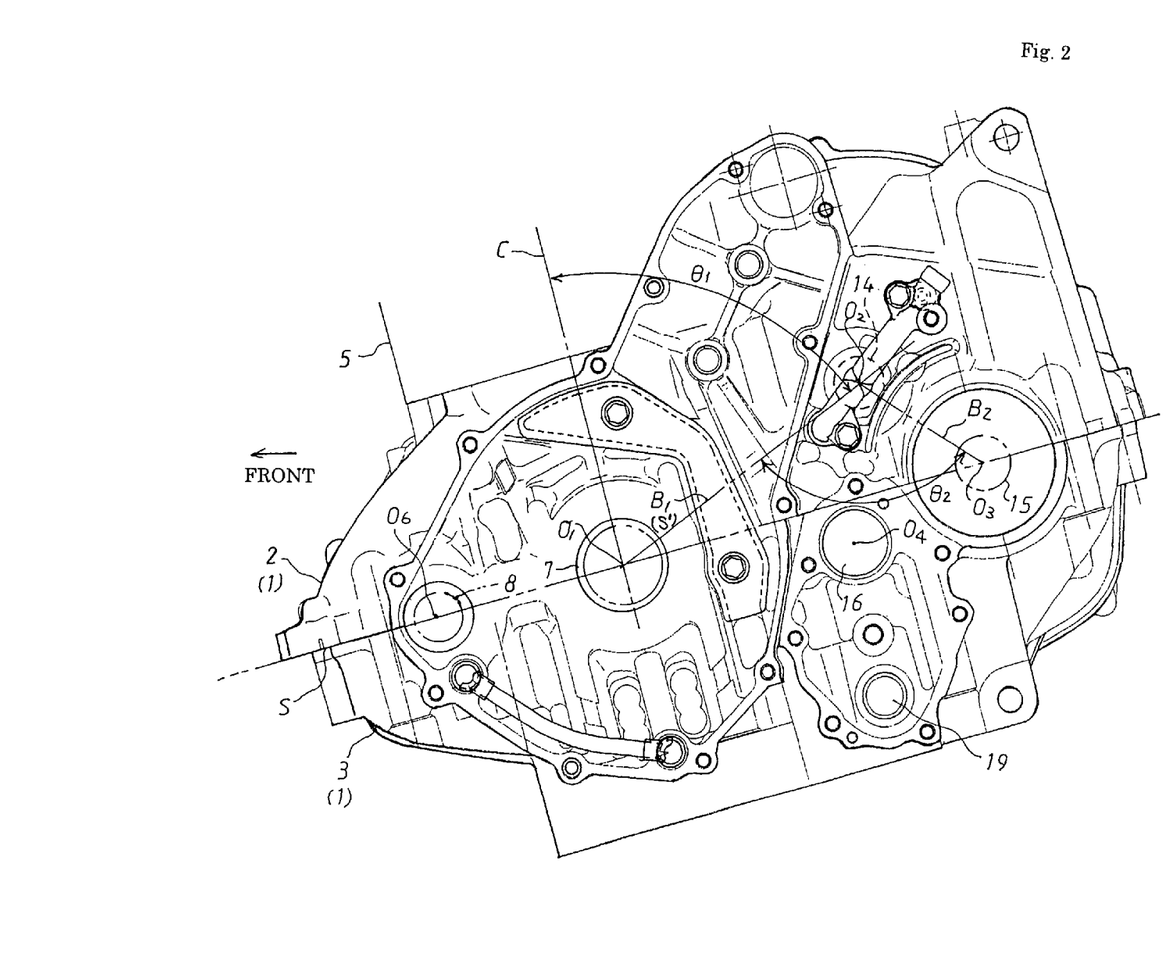
FIG. 2 is a left side view of a crank case in FIG. 1.

FIG. 2 is a left side view of the crank case 1. An axis O1 of the crank shaft 7, an axis O6 of the balancer shaft 8 and an axis O3 of the output shaft 15 are positioned on the mating surface S of the upper and lower crank case members 2 and 3, an axis O2 of the input shaft 14 is positioned above the mating surface S, and an axis O4 of the change drum 16 is positioned below the mating surface S. A change shaft 19 of the change drum 16 having a change pedal is arranged below the change drum 16.

An arrangement position of the input shaft 14 is set such that an angle θ1 formed between a first segment B1 (O1-O2) connecting the axis O2 of the input shaft 14 and the axis O1 of the crank shaft 7, and a cylinder center line C, which is a center of a cylinder bore slidably accommodating a piston, above the axis O1 of the crank shaft 7 is acute. In the present embodiment, the arrangement is set such that the angle O1 is in a range between 75 degrees and about 85 degrees.

An arrangement position of the output shaft 15 is set such that an angle O2 formed between a second segment B2 (O2-O3) connecting the axis O3 of the output shaft 15 and the axis O2 of the input shaft 14, and the first segment B1 (O1-O2) becomes a downward open obtuse angle. In the present embodiment, the arrangement is set such that the angle O2 is in a range between 100 degrees and about 120 degrees.

[Chain Transmission Mechanism of Oil Pump and Chain Guide Thereof]

In FIG. 1, a chain transmission mechanism for driving the pumps is composed of a chain 26 for driving the pumps, the drive sprocket 25 and a driven sprocket 26. The drive sprocket 25 is installed on the right end portion of the input shaft 14 as mentioned above. The driven sprocket 26 is fixed to the common pump shaft 24 for the oil feed pump 50 and the oil scavenging pump 51 arranged in the front lower end portion of the transmission room 11. The chain 27 is wound between the drive sprocket 25 and the driven sprocket 26. A front side chain guide 200 regulating a vibration of a front side portion 27*a* of the chain 27 is arranged between the front side portion 27*a* of the chain 27, that is, the crank chamber 10 side portion of the chain 27, and a crank arm portion 203 of the crank shaft 7. A rear side chain guide 201 is arranged in a rear side portion 27*b* of the chain 27.

In FIG. 4 corresponding to a cross sectional view along a line IV-IV in FIG. 1, the chain 27 for driving the pumps 50 and 51 is arranged approximately at the same positions in the lateral direction with respect to a rightmost weight portion 203*a* of a right crank arm portion 203 of the crank shaft 7. In other words, the front side portion 27*a* of the chain 27 passes through an approximately just rear side of the rightmost end weight portion 203*a*.

In order to prevent the front portion 27*a* of the chain 27 from being brought into contact with the rightmost end weight portion 203*a* of the crank shaft 7, a chain guide 200 to suppress the vibration of the chain 27 is arranged between the front portion 27*a* of the chain 27 and the right weight portion 203*a* of the right crank portion 203.

Figure 6:
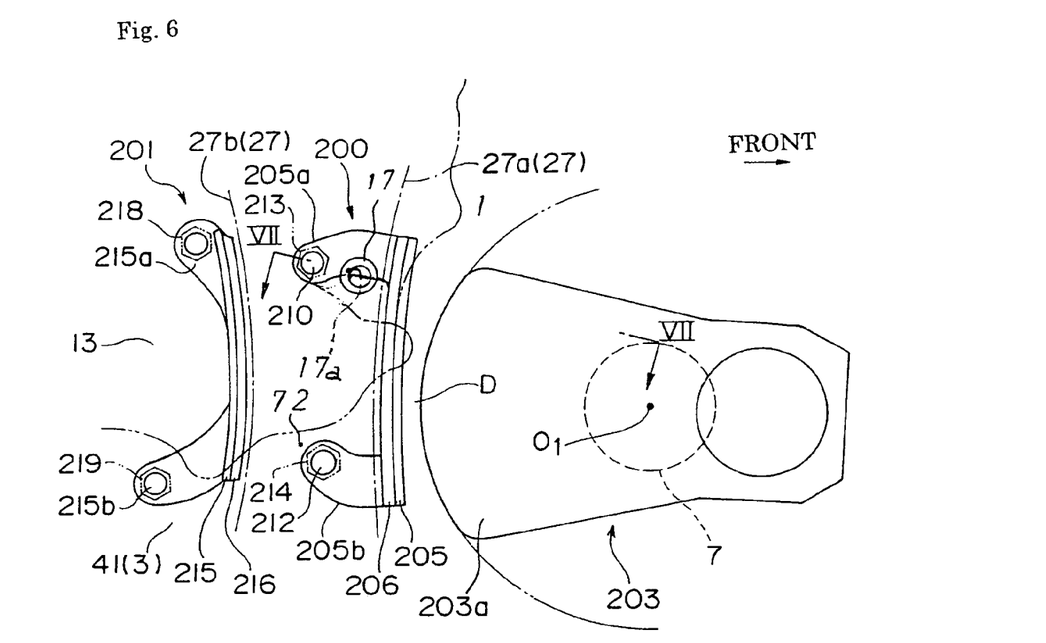
FIG. 6 is a left side view of a chain guide for driving an oil pump and a crank portion of the crank shaft.

FIG. 6 is a right side view clearly showing a positional relation between the front chain guide 200 and the rightmost weight 203*a* of the right crank arm portion 203. The front chain guide 200 is constituted by a guide main body 205 made of a metal, and a guide surface forming member 206 made of a rubber. The guide main body 205 is arranged so as to extend in a vertical direction, and faces an outer peripheral end surface of the rightmost weight portion 203*a* of the right crank arm portion 203 of the crank shaft 7 across a fixed gap D, and the rubber guide surface forming member 206 is stuck to a rear surface of the guide main body 205 by heat crimping or an adhesive agent.

Mounting boss portions 205*a* and 205*b* protruding rearwardly are integrally formed at both upper and lower ends of the metal guide main body 205, respectively. A lower end portion of the upper mounting boss portion 205*a* is engaged with a split groove 17*a* (refer to FIG. 5) formed in an upper half portion of a right end portion of the shift fork shaft 17, whereby the upper mounting boss portion 205*a* serves to position (prevent from coming off) the shift fork shaft 17 in an axial length direction.

The upper mounting boss portion 205*a* is fixed to the shaft support member 13 by a bolt 213, and the lower mounting boss portion 205*b* is fixed to the oil pump cover 72 by a bolt 214.

In this case, the rear chain guide 201 basically has the same structure as the front chain guide 200, and is constituted by a guide main body 215 made of a metal, and a guide surface forming body 216 made of a rubber and stuck to a front surface of the guide main body 215 by heat crimping or an adhesive agent. Mounting boss portions 215*a* and 215*b* extending rearwardly are integrally formed upper and lower end portions of the guide main body 215, the upper mounting boss portion 215a is fixed to the shaft support member 13 by a bolt 218, and the lower mounting boss portion 215b is fixed to the shaft support member 13 by a bolt 219.

Figure 7:
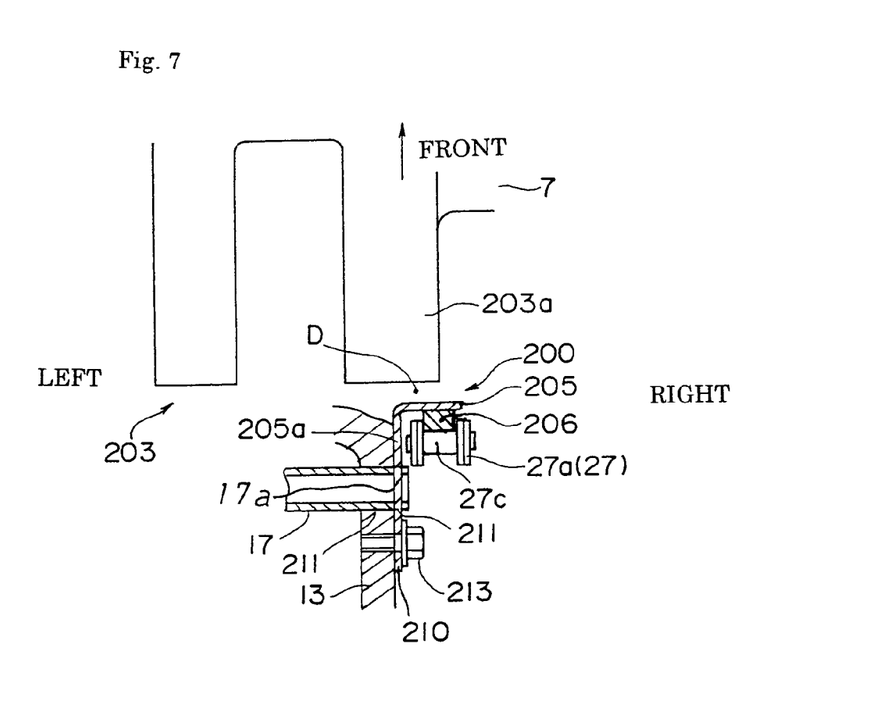
FIG. 7 is a cross sectional view along a line VII-VII in FIG. 6.

FIG. 7 is a cross sectional view along a line VII-VII in FIG. 6. The rubber guide surface forming body 206 of the front chain guide 200 is positioned between right and left coupling plates of the chain 27 and is brought into contact with a coupling pin 27c of the chain 27, thereby regulating the forward vibration of the chain 27, and regulating the lateral vibration. Further, the upper mounting boss portion 205a of the front chain guide 200 is engaged with the split groove 17a of the shift fork support shaft 17 as mentioned above.

[Assembly of Cassette Type Transmission]

The cassette type transmission assembly M can be assembled with respect to the transmission room 11 in a state in which the upper and lower crank case members 2 and 3 are connected, from a right side.

In FIG. 5, the transmission assembly M before being assembled supports at least the input shaft 14, the output shaft 15, the change drum 16 and the right end portion of the shift fork support shaft 17 via the shaft support member 13. In this case, the right end portion of the output shaft 15 is fitted to a needle shaft outer ring 133a previously fitted to an output shaft support hole 132 of the shaft support member 13 via the needle bearing 133. On the other hand, in the left side wall 48 of the upper crank case member 2 of the transmission room 11, at least the cap 113 and the outer ring 109a of the input shaft needle bearing 109 are fitted into the support hole 108 for the input shaft, and the output shaft bearing 126 and the change drum needle bearing 140 are fitted.

The transmission assembly M is inserted as one unit into the transmission room 11 from the right side. Then, the left end portion of the input shaft 14 is fitted in the support hole 108 via the bearing 109, the left end portion of the output shaft 15 is fitted in the support hole formed by upper and lower concave portions 45 via the bearings 126, the left end portion of the change drum 16 is fitted in the support hole 46, and the left end portions of the shift arm support shafts 17 are directly fitted in the support hole 47. The shaft support member 13 is fixed to the mounting wall 41 by a plurality of bolts 43 in FIG. 1.

After assembling the transmission assembly M, the drive sprocket 25 is fitted to the right end portion of the input shaft 14 shown in FIG. 5, the drive chain 27 is wound from the drive sprocket 25 over the driven sprocket 26 of the common pump shaft 24 for driving the pumps, and the front and rear chain guides 200 and 201 are next attached.

Thereafter, as mentioned above, the upper mounting boss portion 205a of the front chain guide 200 is fixed to the shaft support member 13 by the bolt 213, and the lower mounting boss portion 205b of the front chain guide 200 is fixed to the oil pump cover 72 by the bolt 214. Further, the upper mounting boss portion 215a of the rear chain guide 201 is fixed to the shaft support member 13 by the bolt 218, and the lower mounting boss portion 215b of the rear chain guide 201 is fixed to the shaft support member 13 by the bolt 219 (refer to FIG. 6).

As mentioned above, after attaching the chain guides 200 and 201, the clutch 18 in FIG. 5 is attached to the input shaft 14.

In this case, the attaching order mentioned above shows one example, and the cassette type transmission in accordance with the present invention is not limited to the assembling order mentioned above.

Effect of Embodiment of Present Invention (1) Since the input shaft 14 is arranged in such a manner that the angle θ1 formed between the first segment B1 (O1-O2) connecting the axis O2 of the input shaft 14 of the transmission within the transmission room 11 and the axis O1 of the crank shaft 7, and the cylinder center line C above the axis O1 of the crank shaft 7 is acute as seen from the axial length direction of the crank shaft 7, it is possible to make the dimension in the longitudinal direction of the engine compact, and it is possible to make the position of the input shaft 14 high, and it is possible to increase the oil capacity.

(2) Since the clutch 18 is installed at the end portion of the input shaft 14 arranged at the high position as mentioned above, it is possible to avoid the clutch 18 from dipping into the oil in the oil reservoir chamber while increasing the oil amount in the oil reservoir chamber, it is possible to reduce the stirring resistance, and it is possible to improve the output.

(3) Since the output shaft 15 of the transmission room 11 is arranged at the position more away from the crank shaft 7 than the input shaft 14, and the output shaft 15 is arranged in such a manner that the downward open angle O2 formed between the second segment B2 (O2-O3) connecting the axis O3 of the output shaft 15 and the axis O2 of the input shaft 14, and the first segment (O1-O2) is obtuse, it is possible to make the position of the output shaft 15 high, and it is possible to further increase the oil capacity in the oil reservoir chamber, in the semidry sump type engine.

(4) Since the transmission assembly M is structured by having the input shaft 14 and the output shaft 15 supported by the shaft support member 13, and the transmission assembly M is installed within the transmission room 11 so as to be detachable as one unit, it can be easily realized to arrange the input shaft above the line connecting the axis of the crank shaft and the axis of the output shaft as seen in the axial length direction of the crank shaft, and to make the angle between the first segment connecting the axis of the crank shaft and the axis of the input shaft, and the center line of the cylinder acute.

Other Embodiments (1) In the embodiment mentioned above, for example, in FIG. 2, the axis O1 of the crank shaft 7 and the axis O3 of the output shaft 15 are arranged at the mating surface S of the upper and lower crank case members 2 and 3, the structure may be made such that the axis O2 of the input shaft 14 is arranged at the mating surface of the upper and lower crank case members 2 and 3 together with the axis O1 of the crank shaft 7. For example, in FIG. 2, a mating surface S' of the upper and lower crank case members 2 and 3 exists on the segment B1 (O1-O2) connecting the axis O1 of the crank shaft 7 and the axis O2 of the input shaft 14, and the output shaft 15 is arranged in such a manner that the axis O3 of the output shaft 15 is positioned below the mating surface S' (O1-O2). In accordance with the structure mentioned above, it is possible to achieve the compact structure in the longitudinal direction of the engine, in the same manner as the embodiment mentioned above.

(2) In the embodiment mentioned above, the angle O1 formed between the first segment (O1-O2) connecting the axis O2 of the input shaft 14 and the axis O1 of the crank shaft 7, and the cylinder center line C above the axis O1 of the crank shaft 7 is set to 75 degrees to 85 degrees, and the downward open angle θ2 formed between the second segment (O2-O3) connecting the axis O3 of the output shaft 15 and the axis O2 of the input shaft 14, and the first segment (O1-O2) is set to 100 degrees to 120 degrees; however, the present invention is not limited to these angular ranges, but can be appropriately modified.

(3) In the embodiment mentioned above, the rear chain guide 201 guiding the rear portion 27b of the chain 27 is provided; however, the rear chain guide 201 can be omitted.

(4) In the embodiment mentioned above, the structure is made such that the oil feed pump 50 and the oil scavenging pump 51 are driven by the chain transmission mechanism; however, the structure may be made such that a water pump is arranged in the transmission room 11 as a hydraulic pump driven by the chain transmission mechanism.

(5) The embodiment mentioned above is structured such that the pump driving power is taken out from the input shaft 14; however, the structure may be made such that the power for driving the pump is taken out from the other gear change shaft which is normally rotated, via the chain transmission mechanism, within the transmission assembly M, during the operation.

(6) The embodiment mentioned above relates to the semi-dry sump type lubricating apparatus utilizing the transmission room as the oil reservoir chamber, but may be structured as a dry sump type lubricating apparatus in which an independent oil tank is installed in an outer portion of the crank case. Further, the present invention can be applied to a normal engine in which predetermined oil is reserved within the oil pan.

(7) In addition to the engine for the motorcycle, the present invention can be applied to an engine for other vehicles such as a four-wheeled vehicle or the like.

Although the invention has been described in its preferred embodiments with a certain degree of particularity, obviously many changes and variations are possible therein. It is therefore to be understood that the present invention may be practical otherwise than as specifically described herein without departing from the scope and spirit thereof.

What is claimed is:

1. A shaft arrangement structure of an engine which is provided with a crank case divided into upper and lower crank case members, forms a transmission room accommodating a transmission of the engine within the crank case, and utilizes a lower portion of the transmission room as an oil reservoir chamber of the engine, wherein an input shaft of the transmission is positioned above a line connecting an axis of a crank shaft of the engine and an axis of an output shaft of the transmission as seen in an axial length direction of the crank shaft, wherein an angle formed between a first segment connecting the axis of the crank shaft and an axis of the input shaft, and a center line of a cylinder of the engine above the axis of the crank shaft is acute, and wherein the output shaft is arranged at a position more away from the crank shaft than the input shaft, and the output shaft is arranged in such a manner that a downward open angle formed between a second segment connecting the axis of the output shaft and the axis of the input shaft and the first segment is obtuse.

2. The shaft arrangement structure of the engine as claimed in claim 1,
wherein the axis of the crank shaft and the axis of the output shaft are arranged on a mating surface of the upper and lower crank case members.

3. The shaft arrangement structure of the engine as claimed in claim 1,
wherein the axis of the crank shaft and the axis of the input shaft are arranged on a mating surface of the upper and lower crank case members.

4. The shaft arrangement structure of the engine as claimed in claim 1,
wherein a clutch to connect drivingly the crank shaft and the transmission is installed at an end portion of the input shaft.

5. The shaft arrangement structure of the engine as claimed in claim 1,
wherein a transmission assembly is structured such that the input shaft and the output shaft are supported by a shaft supporting member, and the transmission assembly is installed in the transmission room so as to be detachable as one unit.

6. The shaft arrangement structure of the engine as claimed in claim 5,
wherein the shaft supporting member of the transmission assembly is structured such as to support a change drum and a shift fork support shaft of the transmission.

7. The shaft arrangement structure of the engine as claimed in claim 5,
wherein an end portion of the input shaft protrudes from the shaft supporting member, and a clutch to connect drivingly the crank shaft and the transmission is installed at the protruding end portion of the input shaft.

* * * * *